United States Patent
Alex et al.

(10) Patent No.: US 9,904,897 B2
(45) Date of Patent: Feb. 27, 2018

(54) GENERATION OF SOCIAL BUSINESS INSIGHTS BY FRACTAL ANALYSIS

(71) Applicant: International Business Machines Corporation, Armonk, NY (US)

(72) Inventors: Gokul B. Alex, Mayyanad (IN); Vijay Kumar Ananthapur Bache, Bangalore (IN); Felice Mansi, Andria (IT); Rengia R. Vasudevan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 386 days.

(21) Appl. No.: 14/672,309

(22) Filed: Mar. 30, 2015

(65) Prior Publication Data

US 2016/0292600 A1  Oct. 6, 2016

(51) Int. Cl.
  *G06Q 10/00*  (2012.01)
  *G06Q 10/06*  (2012.01)
  *G06N 3/04*  (2006.01)
  *G06Q 50/00*  (2012.01)

(52) U.S. Cl.
  CPC ....... *G06Q 10/0637* (2013.01); *G06N 3/0418* (2013.01); *G06Q 50/01* (2013.01)

(58) Field of Classification Search
  CPC ... G06Q 10/0637; G06Q 50/01; G06N 3/0418
  USPC ........................................................ 705/7.36
  See application file for complete search history.

(56) References Cited

U.S. PATENT DOCUMENTS

| 8,280,641 | B1 * | 10/2012 | Pellionisz | ............... G06F 19/22 702/19 |
| 8,301,545 | B1 | 10/2012 | Shah | |
| 8,306,845 | B2 | 11/2012 | D'Imporzano et al. | |
| 2001/0037999 | A1 * | 11/2001 | Martin | ................... D06C 23/00 219/121.85 |
| 2007/0050239 | A1 * | 3/2007 | Caneva | .................. G06Q 10/06 705/7.14 |

(Continued)

FOREIGN PATENT DOCUMENTS

EP  2557534 A1  2/2013

OTHER PUBLICATIONS

Tsugawa et al. "Emergence of Fractals in Social Networks: Analysis of Community Structure and Interaction Locality" (2014) 2014 IEEE 38th Annual International Computers, Software and Applications Conference, p. 568-575.*

(Continued)

*Primary Examiner* — Sujay Koneru
(74) *Attorney, Agent, or Firm* — Edward J. Wixted, III

(57) ABSTRACT

Generating a social business insight is provided. An analysis parameter is selected. The analysis parameter represents a characteristic of a plurality of entities. A first data stream is retrieved. The first data stream is associated with a first entity of the plurality of entities and includes data from at least a CRM platform, a media platform, or a company asset database. A second data stream is retrieved. The second data stream is associated with a second entity of the plurality if entities and includes data from the media platform. A fractal analysis is performed based on the first data stream, the second data stream, and the analysis parameter. A fractal map is generated, where the fractal map depicts a relationship between the first data stream and the second data stream.

17 Claims, 3 Drawing Sheets

(56) References Cited

U.S. PATENT DOCUMENTS

| | | | |
|---|---|---|---|
| 2008/0104225 A1 | 5/2008 | Zhang et al. | |
| 2010/0119053 A1* | 5/2010 | Goeldi | G06Q 10/00 379/265.09 |
| 2012/0047219 A1 | 2/2012 | Feng et al. | |
| 2012/0089429 A1 | 4/2012 | Geddes et al. | |
| 2012/0185544 A1 | 7/2012 | Chang et al. | |
| 2012/0259674 A1 | 10/2012 | Cantwell et al. | |
| 2012/0296693 A1 | 11/2012 | McGill et al. | |
| 2013/0002675 A1* | 1/2013 | Hicks | H04W 24/08 345/440 |
| 2013/0073387 A1* | 3/2013 | Heath | G06Q 50/01 705/14.53 |
| 2013/0097176 A1 | 4/2013 | Khader et al. | |
| 2013/0124336 A1 | 5/2013 | Fein et al. | |
| 2013/0185106 A1 | 7/2013 | Donatone et al. | |
| 2013/0198093 A1* | 8/2013 | Taylor, III | G06Q 50/18 705/311 |
| 2013/0262168 A1 | 10/2013 | Makanawala et al. | |
| 2013/0282417 A1 | 10/2013 | Gaedcke et al. | |
| 2013/0304819 A1* | 11/2013 | Oane | H04L 51/32 709/204 |
| 2014/0074844 A1* | 3/2014 | Subramanian | G06Q 10/10 707/739 |
| 2014/0279344 A1* | 9/2014 | Creamer | G06Q 40/04 705/37 |
| 2015/0032675 A1* | 1/2015 | Huehn | G06Q 50/01 706/12 |
| 2015/0089626 A1* | 3/2015 | Korangy | H04L 67/1097 726/12 |

OTHER PUBLICATIONS

Bourke, Paul, "Julia Set Fractal (2D)", Jun. 2001, <http://paulbourke.net/fractals/juliaset/>.

Mohan et al., "Service System of Social Network with CRM Application", Information Systems Review, vol. 12, No. 1, Apr. 2010, pp. 1-22, <http://bipinupadhyaya.files.wordpress.com/2010/06/service-system-of-social-network-with-crm-application.pdf>.

"Integrating social media and advanced analytics for richer customer insight", © Copyright IBM Corporation 2013, Produced in the United States of America, Feb. 2013, <http://www.mobilityeye.com/SMA%20Brochures%20and%20data%20sheets.pdf>.

* cited by examiner

GENERATION OF SOCIAL BUSINESS INSIGHTS BY FRACTAL ANALYSIS

BACKGROUND OF THE INVENTION

The present invention relates generally to the field of social media mining and, more particularly, to social business insights from a mixed media data stream.

Social media mining is the process of representing, analyzing, and extracting actionable patterns from social media data. Algorithms are utilized in social media mining to explore massive amounts of data. Social media data is created by users of computer-mediated tools that allow for the creation, sharing, and exchange of information, ideas and pictures.

Social business analytics is the use of social media mining for furthering business ventures. The vast amount of information available through social media can be used to increase business awareness of client activities. Social business analytics are used in marketing strategies by gathering information shared on social media platforms in order to drive sales.

SUMMARY

According to one embodiment of the present disclosure, a method for generating social business insights is provided. The method includes selecting, by one or more processors, an analysis parameter, wherein the analysis parameter represents a characteristic of a plurality of entities; receiving, by one or more processors, a first data stream, wherein the first data stream is associated with a first entity of the plurality of entities, and wherein the first data stream comprises data from at least one of i) a CRM platform, ii) a media platform, and iii) a company asset database; receiving, by one or more processors, an second data stream, wherein the second data stream is associated with a second entity of the plurality of entities, and wherein the second data stream comprises data from the media platform; performing, by one or more processors, a fractal analysis based, at least in part, on the first data stream and the second data stream, wherein the fractal analysis is based on the analysis parameter; and generating, by one or more processors, a fractal map based on the fractal analysis, wherein the fractal map depicts a relationship between a first data stream and a second data stream.

According to another embodiment of the present disclosure, a computer program product for generating social business insights is provided. The computer program product comprises a computer readable storage medium and program instructions stored on the computer readable storage medium. The program instructions include program instructions to select an analysis parameter, wherein the analysis parameter represents a characteristic of a plurality of entities; program instructions to receive a first data stream, wherein the first data stream is associated with a first entity of the plurality of entities, and wherein the first data stream comprises data from at least one of i) a CRM platform, ii) a media platform, and iii) a company asset database; program instructions to receive a second data stream, wherein the second data stream is associated with a second entity of the plurality of entities, and wherein the second data stream comprises data from the media platform; program instructions to perform a fractal analysis based, at least in part, on the first data stream and the second data stream, wherein the fractal analysis is based on the analysis parameter; and program instructions to generate a fractal map based on the fractal analysis, wherein the fractal map depicts a relationship between a first data stream and a second data stream.

According to another embodiment of the present disclosure, a computer system for generating social business insights is provided. The computer system includes one or more computer processors, one or more computer readable storage media, and program instructions stored on the computer readable storage media for execution by at least one of the one or more processors. The program instructions include program instructions to select an analysis parameter, wherein the analysis parameter represents a characteristic of a plurality of entities; program instructions to receive a first data stream, wherein the first data stream is associated with a first entity of the plurality of entities, and wherein the first data stream comprises data from at least one of i) a CRM platform, ii) a media platform, and iii) a company asset database; program instructions to receive a second data stream, wherein the second data stream is associated with a second entity of the plurality of entities, and wherein the second data stream comprises data from the media platform; program instructions to perform a fractal analysis based, at least in part, on the first data stream and the second data stream, wherein the fractal analysis is based on the analysis parameter; and program instructions to generate a fractal map based on the fractal analysis, wherein the fractal map depicts a relationship between the first data stream and the second data stream.

DETAILED DESCRIPTION

Social business platforms utilize enterprise social media mining to ascertain certain business relationships. Social business platforms are end to end ecosystems providing insight into the inter-relationships of customers, enterprise assets, and employees. The insights can be used to promote new business opportunities. Social network analysis algorithms are the primary tools used in social business analytics. However, social business, and the unique relationships between customer information and enterprise information, does not always fit within a social network model.

Embodiments of the present invention provide generating social business insights directed toward the unique relationship between multiple entities, including customers and employees. The use of social media information, customer relationship management (CRM) information, and company asset information in social business algorithms can provide a model that represents the employee-customer relationship. In some embodiments, the social business algorithm is used for employee management, where each employee's skills can be matched with customer needs. Embodiments of the present invention map employee characteristics with customer characteristics to determine possible employee-customer relationships to increase employee efficacy.

Figure 1:
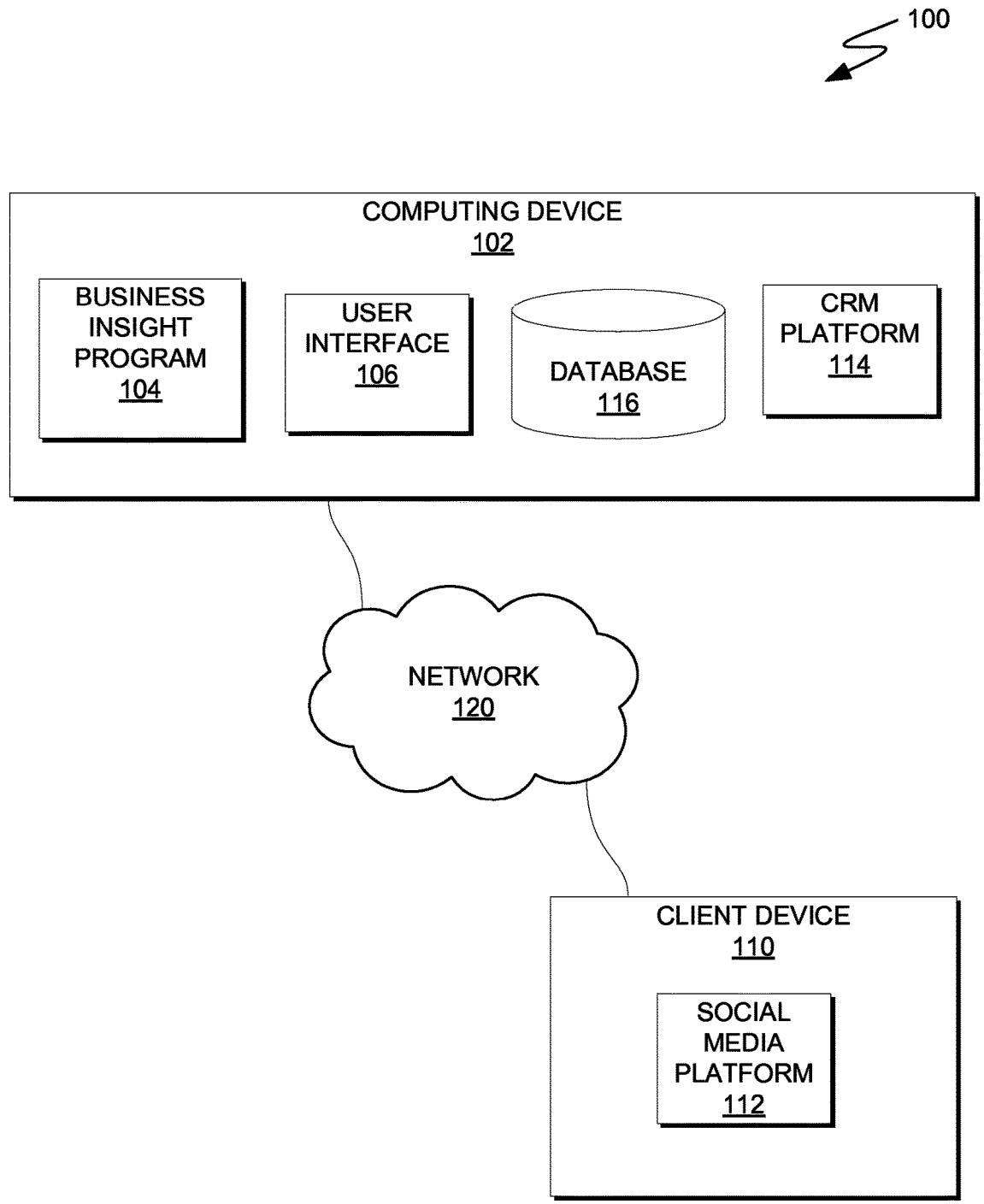
FIG. 1 is a functional block diagram illustrating a computing environment, in accordance with an embodiment of the present disclosure.

The present disclosure will now be described in detail with reference to the Figures. FIG. 1 is a functional block diagram illustrating a computing environment, in accordance with an embodiment of the present disclosure. For example, FIG. 1 is a functional block diagram illustrating computing environment 100. Computing environment 100 includes computing device 102 and client device 110 connected over network 120. Computing device 102 includes business insight program 104, CRM platform 114, database 116, and user interface 106.

In various embodiments, computing device 102 is a computing device that can be a standalone device, a server, a laptop computer, a tablet computer, a netbook computer, a personal computer (PC), or a desktop computer. In another embodiment, computing device 102 represents a computing system utilizing clustered computers and components to act as a single pool of seamless resources. In general, computing device 102 can be any computing device or a combination of devices with access to client device 110, CRM platform 114, social media platform 112, database 116, and business insight program 104 and is capable of executing business insight program 104. Computing device 102 may include internal and external hardware components, as depicted and described in further detail with respect to FIG. 3.

In some embodiments, business insight program 104, user interface 106, CRM platform 114, and database 116 are stored on computing device 102. In other embodiments, one or more of business insight program 104, user interface 106, CRM platform 114, and database 116 may reside on another computing device, provided that each can access and is accessible by each other of business insight program 104, user interface 106, social media platform 112 and CRM platform 114. In yet other embodiments, business insight program 104, user interface 106, CRM platform 114, and database 116 may be stored externally and accessed through a communication network, such as network 120. Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communications between computing device 102 and client device 110, in accordance with a desired embodiment of the present invention.

Business insight program 104 operates to provide relationship insight data between multiple entities, including customers and employees. In order to facilitate discussion, embodiments of the present invention are discussed herein using customers and employees as an illustrative example of entities, but it should be understood that customers and employees are merely one example of entities to which embodiments of the invention may apply. Business insight program 104 uses a Julia set fractal algorithm to map employee-customer relationships. Coefficients for the fractal algorithm are generated from data streams. Business insight program 104 receives data streams from social media platform 112, customer relationship management (CRM) platform 114, and database 116. The data streams function as parameters in the fractal analysis of the employee-customer relationship. A parameter is a sub-set of the data stream associated with a specific characteristic of the employee or customer. For example, parameters may include knowledge base of a product, interest in a specific topic, geographic location, social circle, or any other characteristic found in a user's profile of social media platform 112 or CRM platform 114. The data streams from social media platform 112 are deleted in response to the fractal algorithm computing $z(n)$ for each of the parameters established by business insight program 104.

In some embodiments, the parameters are determined by a system administrator. The system administrator determines what characteristics are relevant to the business relationship. The parameters determine commonalities between an employee and a customer, improving the efficacy of the employee-customer relationship. For example, in an automobile sales environment, color preferences, vehicle style preferences, and family size are relevant to selling a vehicle. In this example, a system administrator will choose color preferences, vehicle preferences, and family attributes as parameters. In other embodiments, parameters are preselected based on the business domain. In this embodiment, parameters for each business domain are predetermined and stored in database 116. For example, in the automobile sales environment, business insight program 104 looks to database 116 to determine that color preferences, vehicle preferences, and family attributes are the relevant parameters. In response to determining the relevant parameters, business insight program 104 locates data corresponding to parameters in social media platform 112 and CRM platform 114.

The Julia set fractal algorithm is used to determine employee-customer relationships. A continuous data stream from social media platform 112, CRM platform 114, and database 116, is used to define the terms of the algorithm. The fractal algorithm utilizes the equation $z(n)=z^2+c$, where c is a constant and z is a variable. The terms of c and z are stored in a database. A constant c represents a single customer or employee on whom the analysis is being computed. In some embodiments, c will represent an employee data stream. In these embodiments, several customer data streams, represented by z, are compared to a single employee data stream to determine the customer profile that most closely matches the employee profile. In other embodiments, c will represent a customer data stream. In these embodiments, multiple employee data streams, represented by z, are compared to a single customer data stream.

The constant c and variable z are determined by analyzing a data stream for customers and employees. For the employee data stream, the employee social media profile on social media platform 112 is analyzed with respect to the chosen parameters. For the customer data stream, the customer CRM profile on CRM platform 114, customer social media profile on social media platform 112, and company asset historical data are analyzed with respect to the chosen parameters. In some embodiments, the company asset historical data is located within the customer CRM profile on CRM platform 114. In other embodiments, the company asset historical data is retrieved from database 116.

The social media profiles and CRM profiles are analyzed using signal processing. Business insight program 104 analyzes the profiles with respect to the chosen parameters. In response to determining the profile has data correlating to one of the chosen parameters, business insight program 104 pulls the data into the data stream. The pulled data is expressed as a data set. For example, a music parameter of the data set would be measured by genre and sub-genre. The data sets are processed by the Julia set fractal algorithm to compare customers and employees.

In some embodiments, parameters have a hierarchical order that may be represented by a data structure such as a tree including multiple levels of nodes. Each level down the tree represents an increase in specificity. For example, where color is a parameter, the tree includes a parent node for color and one or more levels of child nodes of shades for each parent color node. A data stream may indicate a customer's preference for the shade forest green. To compare an employee data stream to the customer data stream, an employee data stream may be analyzed to determine if the employee likes the color green, then analyzed for the shade of dark green, and finally for the shade of forest green. In this example, forest green is a sub-shade of dark green, which is a shade of green. Thus, a parent node for green has a child node for dark green, which has a child node for forest green. In some embodiments, the number of matches on the tree structure is negatively correlated with the distance between the data points on the fractal map. In other embodiments, the depth of deepest matching node of the tree structure is negatively correlated with the distance between the data points on the fractal map. In some embodiments, the tree structure is predetermined (e.g., colors, where a spectrum is well established). In other embodiments, the tree structure is created by the system administrator prior to calculating the fractal algorithm (e.g., vehicle preferences).

The Julia set fractal algorithm, used by business insight program 104, is a fractal algorithm used to discover small perturbations of input data that cause a drastic change in a determined value. The Julia set fractal algorithm is applied iteratively, where each parameter is analyzed by an iteration. The algorithm is computed for each possible employee-customer match iteratively for each parameter. For example, a match needs to be made for ten employees and one customer where three parameters are chosen. In this example, the algorithm will be computed thirty times; once for each employee for each parameter. Business insight program 104 maps the results of each fractal algorithm iteration. Based on the results of the mapping, business insights program 104 recommends an employee-customer match. In some embodiments, the closest z data point to the c data point represents the employee-customer match. In other embodiments, business insight program 104 utilizes statistical analysis to determine which employee-customer match has the greatest number of parameter commonalities.

Business insight program 104 creates a map of the results of the Julia fractal set algorithm. In some embodiments, the map is multi-dimensional, where each parameter is represented as a dimension on the map. For embodiments utilizing more than three parameters, business insight program 104 creates multiple maps. For example, where three parameters are used to analyze the employee-customer relationship, business insight program 104 will plot a 3 dimensional map. Data points representing each of the analyzed employees and customers are plotted with respect to each of the parameters.

CRM platform 114 is system for managing a company's interactions with current and future customers. CRM platform 114 organizes, automates, and synchronizes customer information, including: sales, marketing, customer service, and technical support. In some embodiments, CRM platform 114 documents and provides an internet address to a customer's profile within social media platform 112. In these embodiments, CRM platform will direct business insight program 104 to social media platform 112 when business insight program 104 looks to CRM platform 114 for customer data.

Database 116 is a data repository that may be written to and read by one or any of business insight program 104, social media platform 112, and CRM platform 114. Employee and customer information, such as social media and personnel records, may be stored to database 116. In some embodiments, database 116 may be written to and read by programs and entities outside of computing environment 100 in order to populate the repository with employee and customer information including social media streams.

Computing device 102 includes a user interface (UI), UI 106, which executes locally on computing device 102 and operates to provide a UI to a user of computing device 102. UI 106 further operates to receive user input from a user via the provided user interface, thereby enabling the user to interact with computing device 102. In one embodiment, UI 106 provides a user interface that enables a user of computing device 102 to interact with business insight program 104 of computing device 102 and CRM platform 114. In some embodiments, UI 106 provides a user interface that enables a user of computing device 102 to interact with social media platform 112 of client device 110 via network 120. In various examples, the user interacts with business insight program 104 in order to configure program parameters and view results. In one embodiment, UI 106 is stored on computing device 102. In other embodiments, UI 106 is stored on another computing device (e.g., client device 110), provided that UI 106 can access and is accessible by at least business insight program 104.

In various embodiments of the present disclosure, client device 110 can be a laptop computer, a tablet computer, a netbook computer, a personal computer (PC), a desktop computer, a personal digital assistant (PDA), a smart phone, or any programmable electronic device capable of communicating with computing device 102 via network 120. Client device 110 includes social media platform 112. In this exemplary embodiment, social media platform 112 is stored on client device 110. In other embodiments, social media platform 112 may reside on another computing device, provided that each can access and is accessible by each other of business insight program 104, social media platform 112, CRM platform 114, and database 116. In yet other embodiments, social media platform 112 may be stored externally and accessed through a communication network, such as network 120.

Social media platform 112 is a computer-mediated tool used to create, share, and exchange information among virtual communities. One or more social media platforms 112 can be used by business insight program 104. A user profile, containing information specific to the social media platform user, exists for each employee and customer with social media platform 112. Business insight program 104 can access the user profile of a social media platform user to the extent that the social media platform user consents to make available the user profile. Social media platform 112 may be an enterprise related platform (e.g., IBM Connections) or an employee's personal social media profile. The social media profile contains information pertaining to the likes, skills, background information, etc. of the user (e.g., employee).

Figure 2:
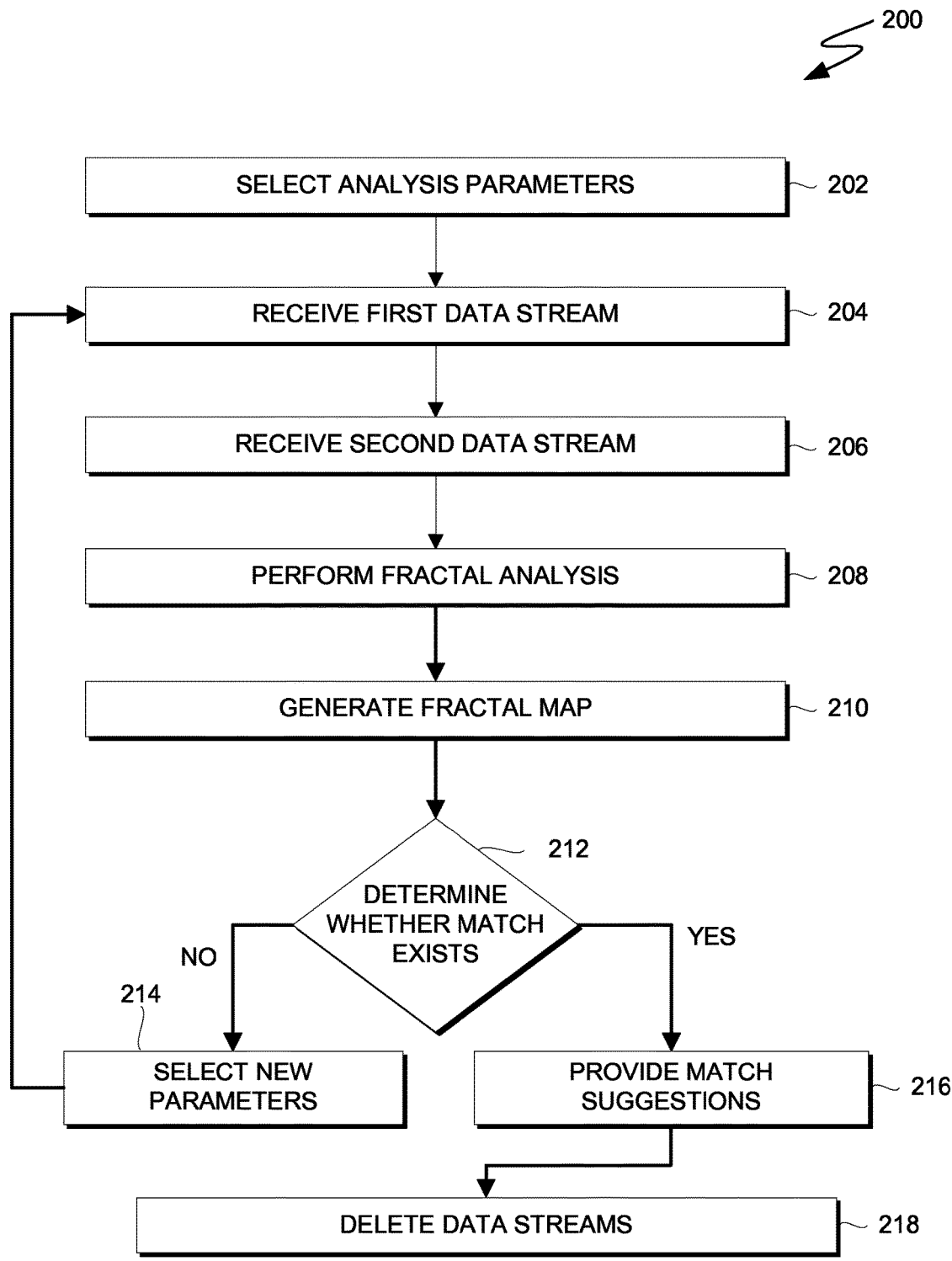
FIG. 2 is a flowchart depicting operations for generating social business insights by fractal analysis, on a computing device within the computing environment of FIG. 1, in accordance with an embodiment of the present disclosure.

FIG. 2 is a flowchart depicting operations for generating social business insights by fractal analysis, on a computing device within the computing environment of FIG. 1, in accordance with an embodiment of the present disclosure. For example, FIG. 2 is a flowchart depicting operations 200 of business insight program 104, on computing device 102 within computing environment 100.

In step 202, business insight program 104 selects an analysis parameter. Parameters are characteristics used by the Julia set fractal algorithm to determine employee-customer relationship matches. Parameters may be any data from the data streams (e.g., customer data stream and employee data stream) including, but not limited to a geographic location, a user interests, a knowledge base, etc. For example, business insight program 104 is used to match an employee to a customer in the entertainment industry. In this example, business insight program 104 uses work history, music interests, and social groups (e.g., mutual contacts) as parameters for the entertainment industry. These parameters will determine an employee-customer relationship match based on which employees have the right experience level, common interests, and social group for the customer data being analyzed.

In some embodiments, the parameters are chosen by a system administrator. In these embodiments the administrator determines the relevant characteristics to the employee-customer relationship. In some embodiments, a relevant weighting can be associated with each parameter. In these embodiments, some parameters can have more influence on the employee-customer relationship match. For example, in an automobile sales environment where color preferences, vehicle style preferences, and family size are the chose parameters, the vehicle style preference may be weighted more than the other parameters. In other embodiments, parameters are preselected based on the business domain. In these embodiments, business insight program 104 receives relevant parameters from database 116. In some embodiments, database 116 indicates a weighting of the parameters. In one or more embodiments the parameter weighting is determined by historical market research. In these embodiments, market research indicates that one or more characteristics are important to customers in business deals.

In step 204, business insight program 104 receives a first data stream. In one embodiment, the first data stream is a data stream representing an employee. The employee data stream is comprised of one or more data streams from social media platforms 112. In some embodiments, the employee data stream is received in real-time, such that a change made to the data in an employee's user profile within social media platform 112 will be reflected in the data stream proximate in time to when the change occurs. In some embodiments, an employee data stream is received for each employee who is available to take on new client matters. In other embodiments, a data stream is received for one employee. In yet other embodiments, a system administrator determines which employee profiles are analyzed and therefore which employee data streams are received.

Business insight program 104 receives data from the employee social media profile related to the chosen parameters. The data is mined from social media platform 112 using signal processing. Signal processing is used to locate data in the employee profile of social media platform 112 related to the chosen parameter. In some embodiments, signal processing uses text recognition, photo recognition, sound recognition, etc. For example, a chosen parameter is color preferences; signal processing will use photo recognition to determine that the employee wears blue more than any other color by a statistically significant margin, based on the photographs located within the employee profile. Therefore, signal processing determines that the employee prefers the color blue. Employee data stream is comprised of a data sets that correspond to each of the chosen parameters.

In step 206, business insight program 104 receives a customer data stream. In one embodiment, the second data stream is a data stream representing a customer. The customer data stream includes data from CRM platform 114, company asset information, and data from social media platform 112. In some embodiments, the customer data stream is received in real-time, such that a change to user data within CRM platform 114 or social media platform 112 will be reflected in the data stream proximate in time to when the change is made. In some embodiments, company asset information and related social media information is found in CRM platform 114. Company asset information includes historical sales data, marketing information, etc.

In some embodiments, business insight program 104 receives a customer data stream for one customer. In these embodiments, the customer data stream is represented by c in the Julia fractal set algorithm. Business insight program 104 receives multiple employee data streams, each represented by z in an iteration corresponding to the employee data stream. This embodiment compares multiple employees to a single customer. In other embodiments, business insight program 104 receives multiple customer data streams. In these embodiments, the customer data stream is represented by z in the Julia set fractal algorithm. Business insight program 104 receives an employee data stream for a single employee, represented by c. This embodiment compares multiple customers to a single employee. Similar to the employee data stream described above, the customer data stream is analyzed using signal processing. The customer data stream is comprised of data sets that represent data corresponding to each of the parameters.

In step 208, business insight program 104 performs the fractal analysis. The employee and customer data streams are analyzed by the Julia set fractal algorithm using each of the selected parameters (step 206). The Julia set fractal analysis uses the Julia set equation of $z(n)=z^2+c$. In embodiments in which one employee is matched to a customer, the customer data stream is used for z and the employee data stream is used for c. Data points that converge are not part of the fractal pattern and indicate that there is not a match. When applied iteratively, the algorithm maps the data points, creating a fractal pattern.

In step 210, business insight program 104 generates a fractal pattern. The fractal pattern represents the employee-customer engagement. The fractal pattern is a record of data points. Business insight program 104 uses the fractal pattern to determine employee-customer matches. The pattern, created by iteratively processing the data streams through the fractal algorithm, shows connections between an employee and a customer based on the one or more parameters.

In response to the generation of the fractal pattern, the Julia set fractal data points are analyzed using a Mandelbrot fractal algorithm. The Mandelbrot fractal algorithm determined which data points are connected (e.g., do not diverge to infinity). The Mandelbrot fractal algorithm is used to visualize the correlation between the employee data stream and the customer data stream by creating a map of the data points.

The map created by the fractal algorithm represents the employee-customer relationships. In some embodiments, each customer and each employee is represented by a data point on the map. In some embodiments, a data point representing an employee (e.g., a c value) are visually distinct from data points representing a customer (e.g., a z value). For example, if the fractal algorithm is comparing multiple employees (represented by z) to a customer (represented by c), then the map will show the customer data point in red and the employee data points in blue.

Each parameter chosen for analysis is represented as a dimension of the map. At least one parameter must be chosen to utilize the business insight program 104; however, there is no limit to the number of parameters business insight program 104 can analyze. For example, where three parameters are chosen for the analysis, the map will be displayed along three axes. Where more than three parameters are chosen, business insight program 104 creates multiple maps for ease of viewing. The map allows data sets (which may include non-numerical data) to be compared. The closer a z value is to the c value, the better the match.

In decision 212, business insight program 104 determines whether an employee-customer match exists. If business insight program 104 determines that an employee-customer match exists (decision 212, YES branch), then business insight program 104 provides a match suggestion (step 216). If business insight program 104 determines that an employee-customer match does not exist (decision 212, NO branch), then business insight program 104 selects new parameters (step 214). In one embodiment, business insight program 104 determines whether an employee-customer match exists based on the generated fractal pattern in step 210. The employee-customer match is determined by the distance between data points in the fractal pattern (e.g., the closer an employee data point is to a customer data point, the greater likelihood the employee and customer match).

In step 214, business insight program 104 selects new parameters. The new parameters are processed by the Julia set fractal algorithm and compared by the generation of a fractal map. For example, color preference, vehicle preference, and family size are chosen as the first parameters, but do not return a quality (e.g., converging) match between a customer and an employee. Business insight program 104 selects one or more of travel preference, daily commute, and favorite sport as new parameters in place of one or more color preference, vehicle preference, and family size. In some embodiments, business insight program 104 uses all six parameters to determine a possible match. In other embodiments, business insight program 104 discards the results of the first iteration and determines the employee-customer relationship based on the new parameters. In some embodiments, business insight program 104 iterates the fractal algorithm on a sub-set of the data streams. For example, where multiple employee data streams, represented by values of z, were analyzed during the first iteration, only a portion (e.g., 20%) will be analyzed for the second iteration. The sub-set of data streams includes the portion of employee data streams that most-closely matched the customer data stream based on the parameters of the first iteration.

In step 216, business insight program 104 provides a match suggestion. In some embodiments, the suggestion is to assign an employee to a customer based on the employee-customer engagement determined by the fractal pattern. In other embodiments, the suggestion provides a ranking of employees for the customer. For example, a company has six employees who are capable of taking on an additional customer. Business insight program 104 will provide a list from most qualified to least qualified, based on the fractal pattern of each of the employees. In yet another embodiment, the suggestion provides a visual diagram (e.g., a mapping) indicating which customers are the most closely matched to an employee.

In step 218, business insight program 104 deletes customer and employee data streams. The data received from social media platform 112 as data streams is deleted once the information is processed. Data is deleted for privacy reasons. In some embodiments, social media platform 112 has a privacy policy requiring the data to be deleted. The real-time characteristic of the data streams allows the data to be analyzed and used by the fractal algorithm without being retained in direct access memory.

Figure 3:
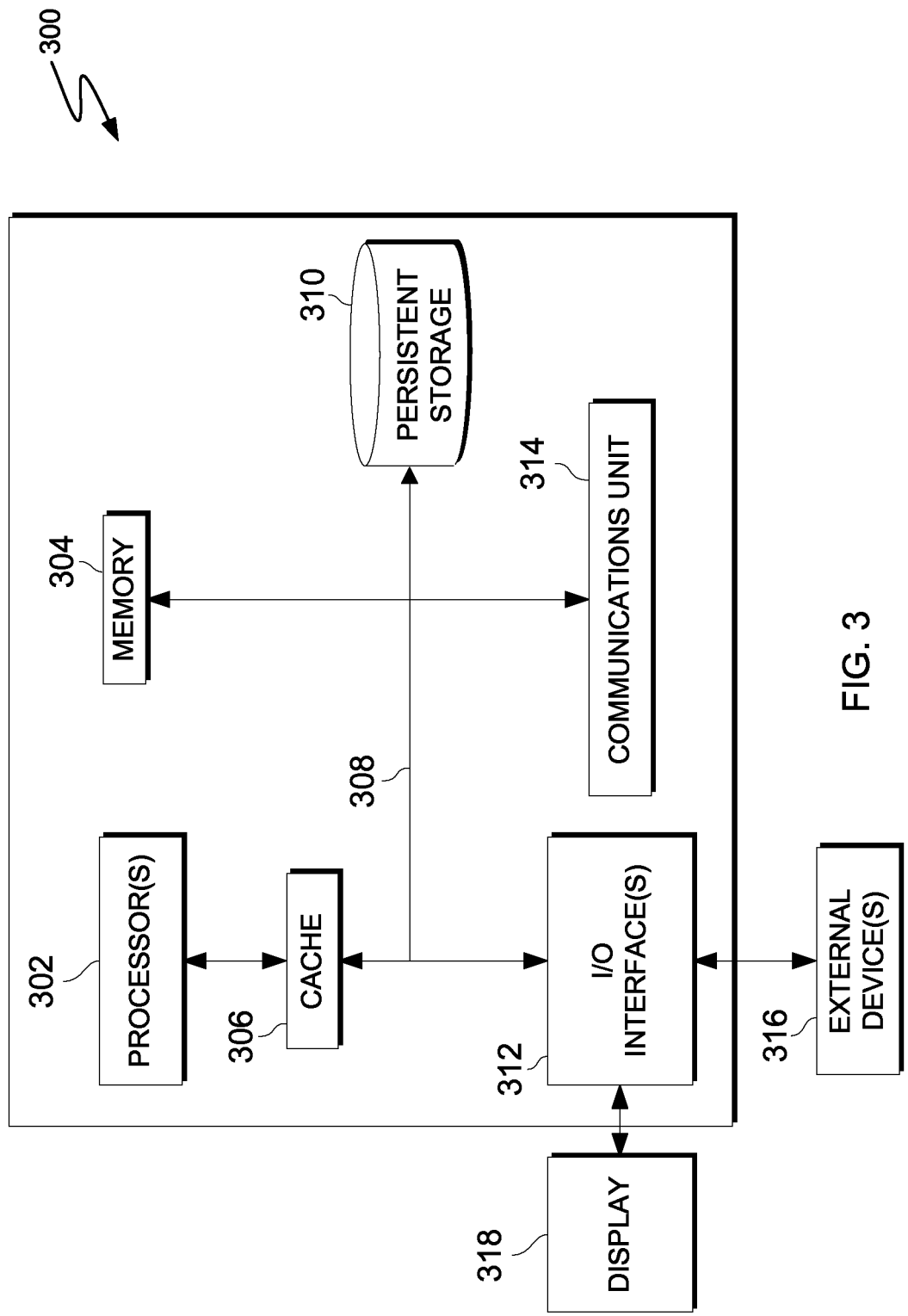
FIG. 3 is a block diagram of components of a computing device executing operations for generating social business insights by fractal analysis, in accordance with an embodiment of the present disclosure.

FIG. 3 is a block diagram of components of a computing device, generally designated 300, in accordance with an embodiment of the present disclosure. In one embodiment, computing device 300 is representative of computing device 102. For example, FIG. 3 is a block diagram of computing device 102 within computing environment 100 executing operations of business insight program 104.

It should be appreciated that FIG. 3 provides only an illustration of one implementation and does not imply any limitations with regard to the environments in which different embodiments may be implemented. Many modifications to the depicted environment may be made.

Computing device 300 includes communications fabric 308, which provides communications between computer processor(s) 302, memory 304, cache 306, persistent storage 310, communications unit 314, and input/output (I/O) interface(s) 312. Communications fabric 308 can be implemented with any architecture designed for passing data and/or control information between processors (such as microprocessors, communications and network processors, etc.), system memory, peripheral devices, and any other hardware components within a system. For example, communications fabric 308 can be implemented with one or more buses.

Memory 304 and persistent storage 310 are computer-readable storage media. In this embodiment, memory 304 includes random access memory (RAM). In general, memory 304 can include any suitable volatile or non-volatile computer readable storage media. Cache 306 is a fast memory that enhances the performance of processors 302 by holding recently accessed data, and data near recently accessed data, from memory 304.

Program instructions and data used to practice embodiments of the present invention may be stored in persistent storage 310 and in memory 304 for execution by one or more of the respective processors 302 via cache 304. In an embodiment, persistent storage 310 includes a magnetic hard disk drive. Alternatively, or in addition to a magnetic hard disk drive, persistent storage 310 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 310 may also be removable. For example, a removable hard drive may be used for persistent storage 310. Other examples include optical and magnetic disks, thumb drives, and smart cards that are inserted into a drive for transfer onto another computer-readable storage medium that is also part of persistent storage 310.

Communications unit 314, in these examples, provides for communications with other data processing systems or devices, including resources of network 120. In these examples, communications unit 314 includes one or more network interface cards. Communications unit 314 may provide communications through the use of either or both physical and wireless communications links. Program instructions and data used to practice embodiments of the present invention may be downloaded to persistent storage 310 through communications unit 314.

I/O interface(s) 312 allows for input and output of data with other devices that may be connected to computing device 300. For example, I/O interface 312 may provide a connection to external devices 316 such as a keyboard, keypad, a touch screen, and/or some other suitable input device. External devices 316 can also include portable computer-readable storage media such as, for example, thumb drives, portable optical or magnetic disks, and memory cards. Software and data used to practice embodiments of the present invention (e.g., software and data) can be stored on such portable computer-readable storage media and can be loaded onto persistent storage 310 via I/O interface(s) 312. I/O interface(s) 312 also connect to a display 318.

Display 318 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for generating social business insights, the method comprising:
    selecting, by one or more processors, an analysis parameter of a plurality of analysis parameters, wherein the analysis parameter represents a characteristic of a plurality of entities;
    assigning, by one or more processors, a weight to the analysis parameter;
    receiving, by one or more processors, a first data stream, wherein the first data stream is associated with a first entity of the plurality of entities, and wherein the first data stream comprises data from a location selected from the group consisting of i) a customer relationship management (CRM) platform, ii) a media platform, and iii) a company asset database;
    receiving, by one or more processors, an second data stream, wherein the second data stream is associated with a second entity of the plurality of entities, and wherein the second data stream comprises data from the media platform;
    analyzing, by one or more processors, a first photograph of the first data stream and a second photograph of the second data stream, utilizing photo recognition;
    identifying, by one or more processors, a characteristic of the first entity and a characteristic of the second entity based on the analysis;
    performing, by one or more processors, a fractal analysis using a Julia set fractal algorithm based, at least in part, on the characteristic of the first entity, the first data stream, the characteristic of the second entity, and the second data stream, wherein:
        the fractal analysis is computed iteratively for each of the plurality of analysis parameters;
        the fractal analysis is based on the analysis parameter; and
        the first data stream is compared to the second data stream and at least an additional data stream; and
    generating, by one or more processors, a fractal map using a Mandelbrot fractal algorithm based on the fractal analysis, wherein:
        the fractal map depicts a relationship between the first data stream and the second data stream; and
        the fractal map is multi-dimensional, wherein the analysis parameter is represented as a dimension on the fractal map.

2. The method of claim 1, wherein the characteristic is selected from the group consisting of i) a preference and ii) one or more historical data sets.

3. The method of claim 1, further comprising:
    generating, by one or more processors, one or more suggestions based, at least in part, on the fractal map.

4. The method of claim 3, further comprising:
    deleting, by one or more processors, the first data stream in response to generating the one or more suggestions; and
    deleting, by one or more processors, the second data stream in response to generating the one or more suggestions.

5. The method of claim 3, wherein the one or more suggestions identify a relationship between the first and second entities depicted by the fractal map.

6. The method of claim 1, wherein the plurality of analysis parameters are in a hierarchical order.

7. A computer program product for generating social business insights, the computer program product comprising:
    a computer readable storage medium and program instructions stored on the computer readable storage medium, the program instructions comprising:
    program instructions to select an analysis parameter of a plurality of analysis parameters, wherein the analysis parameter represents a characteristic of a plurality of entities;
    program instructions to assign a weight to the analysis parameter;
    program instructions to receive a first data stream, wherein the first data stream is associated with a first entity of the plurality of entities, and wherein the first data stream comprises data from a location selected from the group consisting of i) a customer relationship management (CRM) platform, ii) a media platform, and iii) a company asset database;
    program instructions to receive an second data stream, wherein the second data stream is associated with a second entity of the plurality of entities, and wherein the second data stream comprises data from the media platform;
    program instructions to analyze a first photograph of the first data stream and a second photograph of the second data stream, utilizing photo recognition;
    program instructions to identify a characteristic of the first entity and a characteristic of the second entity based on the analysis;
    program instructions to perform a fractal analysis using a Julia set fractal algorithm based, at least in part, on the characteristic of the first entity, the first data stream, the characteristic of the second entity, and the second data stream, wherein:
        the fractal analysis is computed iteratively for each of the plurality of analysis parameters;
        the fractal analysis is based on the analysis parameter; and
        the first data stream is compared to the second data stream and at least an additional data stream; and
    program instructions to generate a fractal map using a Mandelbrot fractal algorithm based on the fractal analysis, wherein:
        the fractal map depicts a relationship between the first data stream and the second data stream; and
        the fractal map is multi-dimensional, wherein the analysis parameter is represented as a dimension on the fractal map.

8. The computer program product of claim 7, further comprising:
    program instructions to generate one or more suggestions based, at least in part, on the fractal map.

9. The computer program product of claim 7, wherein the characteristic is selected from the group consisting of i) a preference and ii) one or more historical data sets.

10. The computer program product of claim 8, further comprising:
program instructions to delete the first data stream in response to generating the one or more suggestions; and
program instructions to delete the second data stream in response to generating the one or more suggestions.

11. The computer program product of claim 8, wherein the one or more suggestions identify a relationship between the first and second entities depicted by the fractal map.

12. The computer program product of claim 7, wherein the plurality of analysis parameters are in a hierarchical order.

13. A computer system for generating social business insights, the computer system comprising:
one or more computer processors;
one or more computer readable storage media;
program instructions stored on the computer readable storage media for execution by at least one of the one or more processors, the program instructions comprising:
program instructions to select an analysis parameter of a plurality of analysis parameters, wherein the analysis parameter represents a characteristic of a plurality of entities;
program instructions to assign a weight to the analysis parameter;
program instructions to receive a first data stream, wherein the first data stream is associated with a first entity of the plurality of entities, and wherein the first data stream comprises data from a location selected from the group consisting of i) a customer relationship management (CRM) platform, ii) a media platform, and iii) a company asset database;
program instructions to receive an second data stream, wherein the second data stream is associated with a second entity of the plurality of entities, and wherein the second data stream comprises data from the media platform;
program instructions to analyze a first photograph of the first data stream and a second photograph of the second data stream, utilizing photo recognition;
program instructions to identify a characteristic of the first entity and a characteristic of the second entity based on the analysis;
program instructions to perform a fractal analysis using a Julia set fractal algorithm based, at least in part, on the characteristic of the first entity, the first data stream, the characteristic of the second entity, and the second data stream, wherein:
the fractal analysis is computed iteratively for each of the plurality of analysis parameters;
the fractal analysis is based on the analysis parameter; and
the first data stream is compared to the second data stream and at least an additional data stream; and
program instructions to generate a fractal map using a Mandelbrot fractal algorithm based on the fractal analysis, wherein:
the fractal map depicts a relationship between the first data stream and the second data stream; and
the fractal map is multi-dimensional, wherein the analysis parameter is represented as a dimension on the fractal map.

14. The computer system of claim 13, further comprising:
program instructions to generate one or more suggestions based, at least in part, on the fractal map.

15. The computer system of claim 13, wherein the characteristic is selected from the group consisting of i) a preference and ii) one or more historical data sets.

16. The computer system of claim 14, further comprising:
program instructions to delete the first data stream in response to generating the one or more suggestions; and
program instructions to delete the second data stream in response to generating the one or more suggestions.

17. The computer system of claim 14, wherein the one or more suggestions identify a relationship between the first and second entities depicted by the fractal map.

* * * * *